L. H. SMITH.
DRILL CHUCK.
APPLICATION FILED MAR. 20, 1913.

1,087,330.

Patented Feb. 17, 1914.
2 SHEETS—SHEET 1.

Witnesses
Lua M. Ash.
Eric Ischinger

Inventor
Lewis H. Smith
By Frank Keefer
Attorney

L. H. SMITH.
DRILL CHUCK.
APPLICATION FILED MAR. 20, 1913.

1,087,330.

Patented Feb. 17, 1914.
2 SHEETS—SHEET 2.

Witnesses

Inventor
Lewis H. Smith
By Frank Keifer
Attorney

UNITED STATES PATENT OFFICE.

LEWIS H. SMITH, OF OLEAN, NEW YORK.

DRILL-CHUCK.

1,087,330.  Specification of Letters Patent.  Patented Feb. 17, 1914.

Application filed March 20, 1913. Serial No. 755,762.

*To all whom it may concern:*

Be it known that I, LEWIS H. SMITH, a citizen of the United States, residing at Olean, in the county of Cattaraugus and State of New York, have invented certain new and useful Improvements in Drill-Chucks, of which the following is a specification.

The object of this invention is to provide an improved chuck for holding drills in a drill press.

Another object of the invention is to construct the chuck so that the drill may be readily detached therefrom.

These and further objects of the invention will be fully illustrated in the accompanying drawings, described in the specification and pointed out in the claims at the end thereof.

Figure 1:
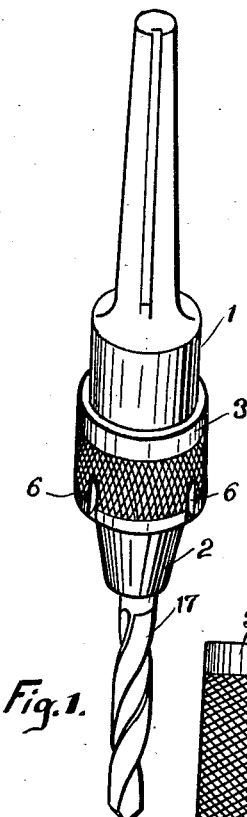
Figure 2:
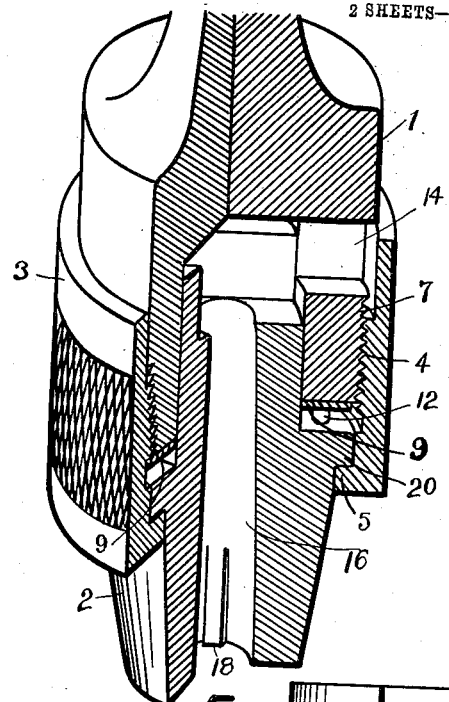
Figure 4:
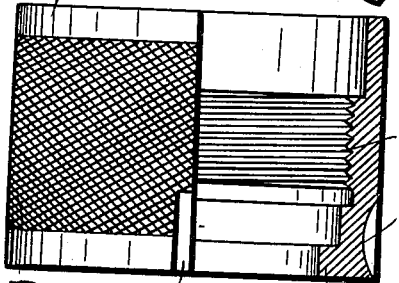
Figure 3:
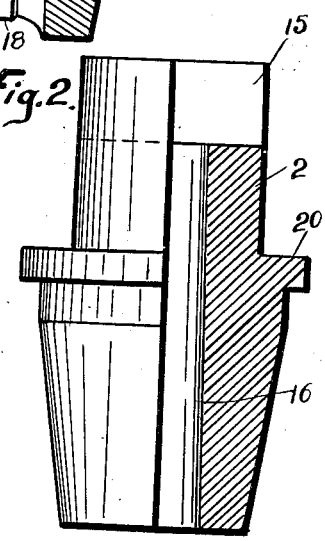
Figure 5:
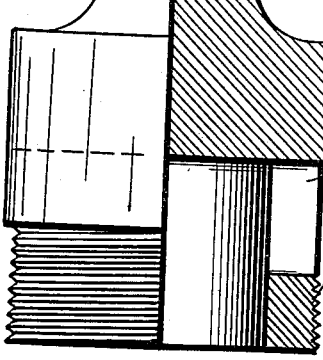
Figure 6:
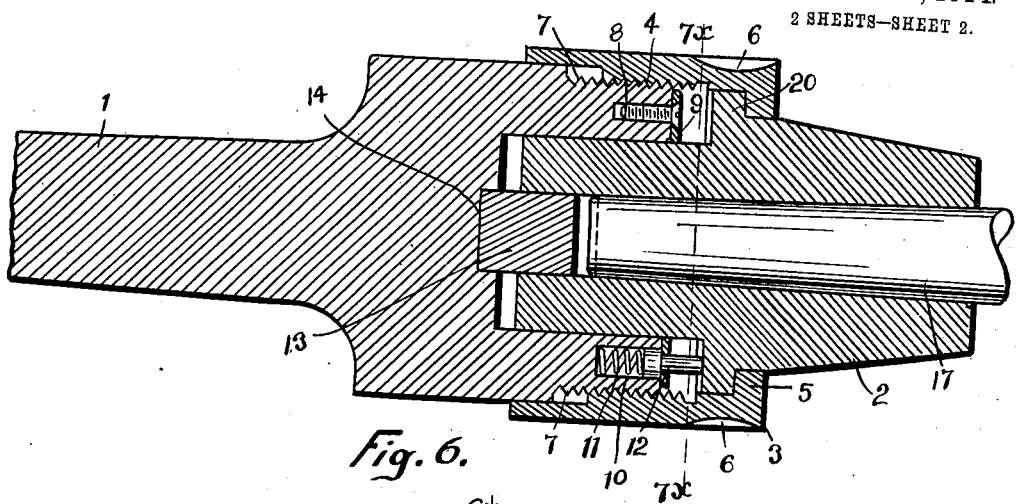
Figure 7:
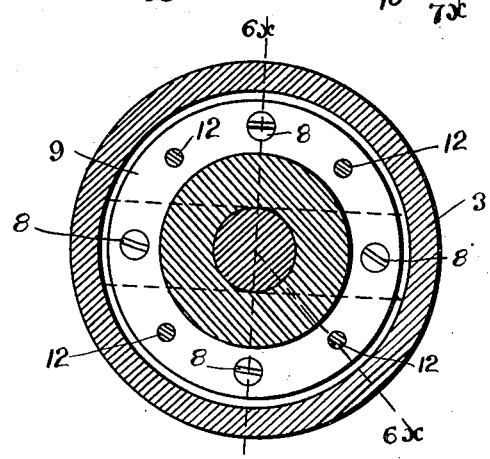
Figure 8:
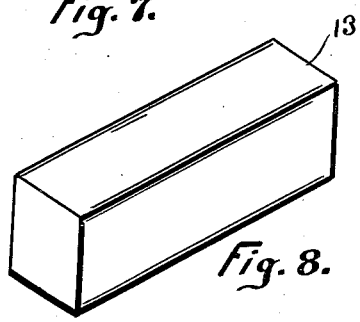

In the accompanying drawings, Figure 1 is a perspective view of my improved drill chuck. Fig. 2 is a sectional view of the chuck. Fig. 3 is a detail sectional view of the socket of the chuck used for receiving the drill. Fig. 4 is a detail view, partly broken away, of the sleeve of the drill chuck. Fig. 5 is a detail view, partly in section, of the chuck holder. Fig. 6 is a longitudinal section of the drill chuck, the section being taken on the line $6^x$—$6^x$ of Fig. 7. Fig. 7 is a section on the line $7^x$—$7^x$ of Fig. 6. Fig. 8 is a perspective view of the key used in connection with the chuck.

In the accompanying drawings like reference numerals refer to like parts.

Reference numeral 1 indicates the part that will hereafter be referred to as the chuck holder.

Reference numeral 2 indicates the chuck proper. For the purpose of connecting the chuck to the chuck holder a sleeve 3 is provided, which sleeve is threaded at 4 with a female thread and has the retaining flange 5 thereon. The sleeve is also provided with sockets or slots 6, 6 by which it may be engaged with a spanner for the purpose of turning it when necessary. The chuck holder is provided with a male thread 7 shown in Figs. 2, 5 and 6, which engages with the female thread 4 of the sleeve 3. The chuck holder is threaded for screws 8, 8 as shown in Figs. 6 and 7. A retaining ring 9 is provided in the chuck, which ring has openings therein through which the screws 8, 8 pass into engagement with the chuck holder. The chuck holder is also bored out as indicated at 10 to receive the compression spring 11 and the push pins 12, four of which are used as shown in Fig. 7.

In assembling the chuck the springs 11, 11 are first inserted in the holes 10, there being preferably four holes, and four of the compression springs 11 and pins 12. The push pins 12 are then placed on top of the springs with the small ends pointing out. The retaining ring 9 is then placed upon the chuck holder with the small ends of the push pins 12 extending through the openings in the ring. The retaining ring is then fastened in place by the screws 8, 8, four of which are shown in Fig. 7.

The chuck holder is also provided with a rectangular slot or keyway 14, which keyway runs from the one side to the other of the chuck holder, as is shown by the dotted lines in Fig. 7. A rectangular block or key 13 is provided to engage with this keyway. The key is preferably made large enough so that it will make a forced fit with the keyway.

The upper end of the chuck 2 is slotted at 15 to loosely receive the key 13, the relation of the parts being as shown in section in Fig. 6. The object of this key is to compel the chuck to rotate with the chuck holder.

The chuck 2 is provided with the tapered hole 16 in which to receive the shank of a drill bit 17. The key 18 may be provided for the purpose of making a positive engagement between the chuck and its drill.

The parts of the chuck are assembled as follows: First the retaining ring 9, the springs 11, pins 12 and screws 8 are assembled with the chuck holder as above described. The key 13 is then placed in the chuck holder. The chuck 2 is then placed in proper relation with the chuck holder and is secured thereto by means of the sleeve 3, which has the flange 5 thereon which engages with the flange 20 upon the chuck proper. This chuck may then be placed in a drill press and the drill bit may then be inserted in the chuck and may be applied to its work. The drill bit and the chuck will rise in the chuck holder, carrying with them the pins 12 which in turn compress the springs 11. The chuck proper may continue to rise until the drill bit 17 makes contact with the key 13, by which its further progress will be arrested, still further compressing the springs 11. The sleeve 3 may be turned up so as to take up part or all of the play of the chuck proper in the chuck holder, limiting the possible movement of the bit without releasing the bit. After the work has been done with the drill and it is desired to remove the drill from the chuck, it is only necessary to screw up the sleeve 3 still farther upon the chuck holder, carrying the chuck 2 along with it, which in turn will carry the drill bit 17 into engagement with the key, by which its further movement will be arrested. As the chuck 2 advances still farther, due to the turning of the sleeve 3, it will disengage itself from the drill bit, which can then be easily removed from the chuck.

I claim:

1. In a drill chuck the combination of a chuck holder having a cup shaped recess therein, a chuck having a cylindrical flange intermediate thereof, said flange being adapted to overhang the rim of said cup shaped recess, a cylindrical portion of said chuck of reduced diameter extending from said flange into said chuck holder to loosely engage with said recess and move longitudinally therein, a sleeve having means thereon for engaging with said flange and chuck holder for holding them together.

2. In a drill chuck the combination of a chuck holder having a cup shaped recess therein, a chuck having a reduced cylindrical end adapted to loosely engage with said recess and move longitudinally therein, said chuck having a flange thereon, a sleeve having means thereon for engaging with said flange and chuck holder for holding them together, a key extending transversely through said chuck and chuck holder, holding them positively together for rotation.

3. In a drill chuck the combination of a chuck holder having a cup shaped recess therein, a chuck having a reduced cylindrical end adapted to loosely engage with said recess and move longitudinally therein, said chuck having a flange thereon, a sleeve having a flange thereon for engaging with said chuck flange, said chuck holder and sleeve each being threaded so that each can engage with the other.

4. In a drill chuck the combination of a chuck holder having a cup shaped recess therein, a ring on the end of said holder surrounding said recess, springs located in the end of said chuck holder, pins having large heads engaging with said springs and pressed outwardly thereby, said pins also having shanks thereon extending through suitable openings in said ring and means for fastening said ring to the chuck holder.

5. In a drill chuck the combination of a chuck holder having a cup shaped recess therein, a ring on the end of said holder surrounding said recess, springs located in the end of said chuck holder, pins having large heads engaging with said springs and pressed outwardly thereby, said pins also having shanks thereon extending through suitable openings in said ring and means for fastening said ring to the chuck holder, a chuck having a flange thereon that is engaged by said pins and is normally moved outwardly thereby.

6. In a drill chuck the combination of a chuck holder having a cup shaped recess therein, a ring on the end of said holder surrounding said recess, springs located in the end of said chuck holder, pins having large heads engaging with said springs and pressed outwardly thereby, said pins also having shanks thereon extending through suitable openings in said ring and means for fastening said ring to the chuck holder, a chuck having a flange thereon that is engaged by said pins and is normally moved outwardly thereby, a sleeve having a flange thereon to engage with the flange on said chuck, said sleeve having a threaded engagement with the chuck holder, by the rotation of which sleeve the chuck may be moved longitudinally in the chuck holder.

7. In a drill chuck the combination of a chuck holder, a chuck movable longitudinally in said chuck holder, a key in said chuck holder engaging with said chuck to prevent the rotation thereof in the chuck holder, means for holding the chuck in engagement with the chuck holder and to cause the longitudinal movement of the chuck in the chuck holder.

8. In a drill chuck the combination of a chuck holder, a chuck movable longitudinally in said chuck holder, a key in said chuck holder engaging with said chuck to prevent the rotation thereof in the chuck holder, means for holding the chuck in engagement with the chuck holder and to cause the longitudinal movement of the chuck in the chuck holder, a flange on said chuck, means in the chuck holder engaging with said flange to normally hold the chuck out from the chuck holder.

9. A chuck holder, a chuck movable longitudinally therein, a tapered recess in said chuck, a tapered drill engaging with said recess, a block in the chuck holder, means for moving the chuck longitudinally in the chuck holder to force the drill against the block and out of engagement with the chuck.

10. A chuck holder, a chuck movable longitudinally therein, a tapered recess in said chuck, a tapered drill engaging with said recess, a block in the chuck holder, means for moving the chuck longitudinally in the chuck holder to force the drill against the block and out of engagement with the chuck, said means including a flange on the chuck, a sleeve having a threaded engagement with the chuck holder and having a flange thereon engaging with the flange on the chuck.

11. In a drill chuck the combination of a chuck holder having a cup shaped recess therein closed at one end, a chuck having a reduced cylindrical end adapted to loosely engage in said recess and move longitudinally therein, said chuck having a flange thereon adapted to overhang the rim of said cup shaped recess, a sleeve having means thereon for engaging with said flange and chuck holder for holding them together.

12. In a drill chuck the combination of a chuck holder having a cup shaped recess therein closed on one end, a chuck having a reduced cylindrical end adapted to loosely engage with said recess and move longitudinally therein, said chuck having a flange thereon, a sleeve having means thereon for engaging with said flange and chuck holder for holding them together, said chuck holder, chuck and sleeve being adapted to rotate together.

In testimony whereof I affix my signature in presence of two witnesses.

LEWIS H. SMITH.

Witnesses:
WM. H. McNOLDY,
ALLEN J. HASTINGS.

Copies of this patent may be obtained for five cents each, by addressing the "Commissioner of Patents, Washington, D. C."